United States Patent
Trotta et al.

(10) Patent No.: US 12,422,540 B2
(45) Date of Patent: Sep. 23, 2025

(54) RADAR DEVICE AND METHOD

(71) Applicant: Infineon Technologies AG, Neubiberg (DE)

(72) Inventors: Saverio Trotta, Munich (DE); Reinhard-Wolfgang Jungmaier, Alkoven (AT); Christoph Rumpler, Munich (DE)

(73) Assignee: Infineon Technologies AG, Neubiberg (DE)

( * ) Notice: Subject to any disclaimer, the term of this patent is extended or adjusted under 35 U.S.C. 154(b) by 281 days.

(21) Appl. No.: 17/663,142

(22) Filed: May 12, 2022

(65) Prior Publication Data
US 2022/0365197 A1 Nov. 17, 2022

(30) Foreign Application Priority Data
May 14, 2021 (EP) .................................. 21173904

(51) Int. Cl.
*G01S 13/56* (2006.01)
*G01S 7/35* (2006.01)
*G01S 7/41* (2006.01)
*G01S 13/536* (2006.01)

(52) U.S. Cl.
CPC .............. *G01S 13/56* (2013.01); *G01S 7/352* (2013.01); *G01S 7/415* (2013.01); *G01S 13/536* (2013.01)

(58) Field of Classification Search
CPC .......... G01S 13/56; G01S 7/352; G01S 7/415; G01S 13/536
See application file for complete search history.

(56) References Cited

U.S. PATENT DOCUMENTS

| | | | |
|---|---|---|---|
| 7,450,052 B2 * | 11/2008 | Hausner | G01S 7/411 342/195 |
| 2004/0042552 A1 * | 3/2004 | Dvorkovich | G06T 7/238 348/E5.066 |
| 2015/0022316 A1 | 1/2015 | Dixon et al. | |
| 2016/0252607 A1 * | 9/2016 | Saboo | G01S 13/02 342/107 |
| 2016/0320852 A1 * | 11/2016 | Poupyrev | G06F 3/0325 |
| 2017/0364160 A1 * | 12/2017 | Malysa | G01S 7/415 |
| 2019/0087009 A1 * | 3/2019 | Rao | G01S 7/352 |
| 2020/0073480 A1 | 3/2020 | Hof et al. | |
| 2020/0217930 A1 * | 7/2020 | Zhou | G01S 13/584 |
| 2020/0319302 A1 * | 10/2020 | Nanzer | G01S 13/4454 |
| 2021/0181328 A1 * | 6/2021 | Hayashi | G01S 17/04 |
| 2023/0333209 A1 * | 10/2023 | Liu | G06F 3/017 |
| 2023/0346265 A1 * | 11/2023 | Shin | A61B 5/4815 |
| 2024/0159869 A1 * | 5/2024 | Strobel | G01S 7/415 |

FOREIGN PATENT DOCUMENTS

| | | |
|---|---|---|
| WO | 2016060748 A1 | 4/2016 |
| WO | 2018033574 A1 | 2/2018 |

* cited by examiner

*Primary Examiner* — Marcus E Windrich
(74) *Attorney, Agent, or Firm* — Slater Matsil, LLP

(57) ABSTRACT

In an embodiment, a method includes receiving radar signals and detecting motion based on time-domain processing of the received radar signals. In a further embodiment, a radar device includes a receive circuit configured to receive radar signals; and a time-domain processing circuit configured to detect motion based on time-domain processing of the received radar signals.

20 Claims, 4 Drawing Sheets

RADAR DEVICE AND METHOD

This application claims the benefit of European Patent Application No. 21173904, filed on May 14, 2021, which application is hereby incorporated herein by reference.

TECHNICAL FIELD

The present application relates to radar devices and corresponding methods.

BACKGROUND

For human machine interfaces (HMI), different technical solutions may be used to allow a human being to interact with a technical device. Besides classical ways of interaction like buttons, keyboards, touchscreens and the like, contactless interfaces, which for example recognize gestures, have become of more and more interest.

Sensors using radar devices are capable to detect their environment and detect for example motion, position, velocity, gestures, vital signs etc. of different static or moving objects in a field of view of the radar device, corresponding to an antenna field of view. Based on this, human machine interfaces may be built using radar sensors to control a technical device for example based on motion, vital signs, gestures etc. detected by the radar device.

In such and other applications where a radar device senses the environment, the device must be active for a specific amount of time, also referred to as sensor duty cycle, to sense the environment and identify objects and/or their interaction. This activity of the radar device requires corresponding electric power to be supplied to the radar device.

For example, in HMI applications as mentioned above, it is desirable that the technical device reacts essentially immediately after a gesture is made etc. To achieve this, the radar device alternates between idle/sleep periods with a low power consumption and scan periods where the radar device scans the environment to see if for example presence of a person is detected, in which case the device is "fully woken up", i.e. performs its normal operation to recognize gestures, movements etc., depending on application. Analysis of the received radar signals of such a scan may be performed by a microcontroller/host device, which also needs to be active for the presence detection or woken up for this.

In some applications, for example within portable consumer devices, there are strong requirements regarding low power consumptions, for example to achieve an acceptable battery lifetime before the consumer device needs to be charged again.

SUMMARY

According to an embodiment, a method for a radar device includes receiving radar signals, and detecting motion based on time-domain processing of the received radar signals.

In another embodiment, a radar device includes a receive circuit configured to receive radar signals; and a time-domain processing circuit configured to detect motion based on time-domain processing of the received radar signal.

The above summary merely gives a brief overview over some embodiments and is not to be construed as limiting.

DETAILED DESCRIPTION OF ILLUSTRATIVE EMBODIMENTS

In the following, various embodiments will be described referring to the attached drawings. These embodiments are given by way of example only and are not to be construed as limiting in any way. For example, while embodiments are described comprising a plurality of features (elements, components, steps, acts, events etc.), in other embodiments some of the features may be omitted, or may be replaced by alternative features. In addition to the features explicitly shown and described, further features, for example features used in conventional radar devices, may be provided. For example, embodiments discussed herein relate to detecting a motion using a radar device, and in some embodiments including then activating processing circuitry to analyze radar signals further in case motion is detected. Apart from the motion detection described, the radar device may be implemented in any conventional manner, and such conventional details will not be described herein.

Features from different embodiments may be combined to form further embodiments. Variations, modifications or details described with respect to one of the embodiments may also be applied to other embodiments and will therefore not be described repeatedly.

Embodiments discussed herein use time-domain processing to detect a motion. Time-domain processing means that for example radar signals may be sampled over time to give received signal sample values, and these signals are then processed without transformation to the frequency domain or similar transformation, for example without using transformations like Fourier transformation, fast Fourier transformation (FFT), wavelet transformation and the like. Analysis of received radar signals including such a transformation to the frequency domain will also be referred to as frequency-domain processing herein, in contrast to time-domain processing. In some embodiments, when using time-domain processing a motion is detected, frequency-domain processing circuitry, for example a corresponding microcontroller unit designed or programmed accordingly, may be activated.

Figure 1:
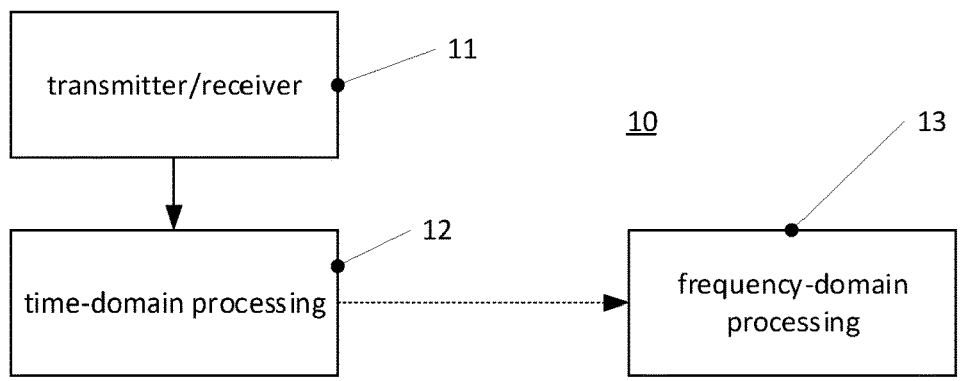
FIG. 1 is a block diagram of a radar device according to an embodiment.

Turning now to the figures, FIG. 1 is a block diagram of a device 10 according to an embodiment.

Radar device 10 includes a transmitter/receiver arrangement 11. Transmitter/receiver arrangement 11 is configured to transmit radar signals and to receive radar signals reflected from objects. Transmitter/receiver arrangement 11 may be implemented in any conventional manner. In some embodiments, radar signals may be transmitted in form of radar chirps. Chirps refer to signals having a changing frequency, in case of radar chirps for example a linearly rising frequency within each chirps. The received radar signals than are received radar chirps reflected from objects. For transmitting and receiving, transmitter/receiver arrangement 11 may include a plurality of antennas, also referred to as antenna array. Beamforming techniques may be applied to scan the surroundings of transmitter/receiver arrangement 11 using such an antenna array in any conventional manner. In other embodiments, a single antenna may be used. In some implementations, transmitter/receiver arrangement 11 and radar system 10 in generally may be part of a human machine interface of an electronic device or other technical device, for example a portable electronic device.

The received radar signals received by transmitter/receiver arrangement 11 in radar device 10 are processed by time-domain processing circuitry 12. Time-domain processing circuitry 12 performs a simple processing of the received radar signals to detect motion. As will be explained further below in more detail, for example the received radar signals may be sampled using an analog-to-digital converter (ADC), and motion may be detected based on differences between samples taken at different points in time, for example corresponding samples from different received radar chirps. "Corresponding samples", as will be explained further below, refer to samples taken at least approximately at the same time position in each chirp, for example a certain time from start of the chirp. "Approximately" means that there may be some tolerances involved.

For applications like a gesture recognition, a more detailed processing including frequency-domain processing is usually used. Device 10 includes frequency-domain processing circuitry 13 configured to perform such in-depth processing of received radar signals.

As long as time-domain processing circuitry 12 does not detect movement, frequency-domain processing circuitry 13 is in a low-power mode, for example switched off or in a power saving state. Only when time-domain processing circuitry 12 detects motion, time-domain processing circuitry 12 wakes up frequency-domain processing circuitry 13 to perform processing of the received radar signal, in order to perform functions radar device 10 is intended for, for example act as a human machine interface. The processing in frequency domain circuitry 13 may be performed in any conventional manner. In some embodiments frequency-domain processing circuitry 13 may be implemented using a microcontroller (MCU), and this MCU may be woken up when the time-domain processing circuitry 12 detects motion.

In embodiments, time-domain processing circuitry 12 may be provided with transmitter receiver arrangement 11 in a same device, for example in a same package. As only time-domain processing circuitry 12 performing comparatively simple processing needs to be active during idle times, power may be saved compared to embodiments where frequency-domain processing circuitry needs to be active at least intermittently to scan the environment for the presence of motion or persons.

In other applications, instead of turning on frequency-domain processing circuitry 13 upon detection of motion by time-domain processing circuitry 12, some other event may be triggered when motion is detected. For example, in home applications, a light in a room may be turned on when motion is detected.

Figure 2:
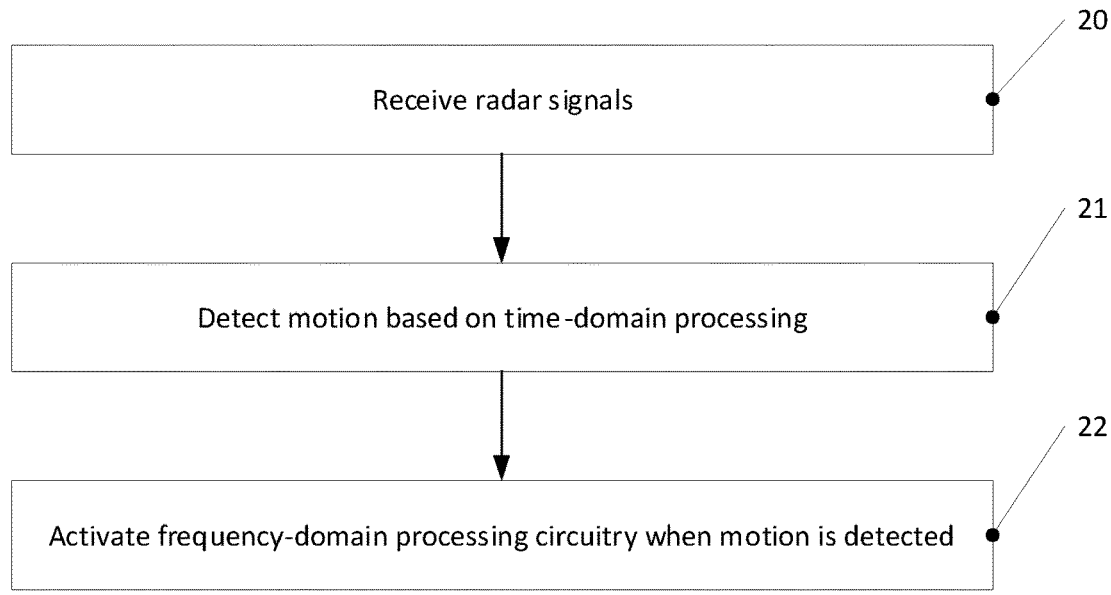
FIG. 2 is a flowchart illustrating a method according to an embodiment.

FIG. 2 is a flowchart illustrating a method according to an embodiment. The method of FIG. 2 may be implemented in the radar device 10 of FIG. 1 or radar devices as discussed further below, but is not limited thereto.

At 20, the method comprises receiving radar signals, for example as explained for transmitter/receiver arrangement 11 of FIG. 1.

At 21, the method comprises detecting motion based on time-domain processing of the received radar signals, as explained for time-domain processing circuitry 12 of FIG. 1. In case motion is detected, at 22 the method additionally may comprise activating frequency-domain processing circuitry, for example a microcontroller unit (MCU) for processing the radar signals, as explained for frequency-domain processing circuitry 13 of FIG. 1.

In the following, implementation possibilities for time-domain processing circuitry to detect motion and corresponding methods according to various embodiments will be discussed in more detail.

Figure 3:
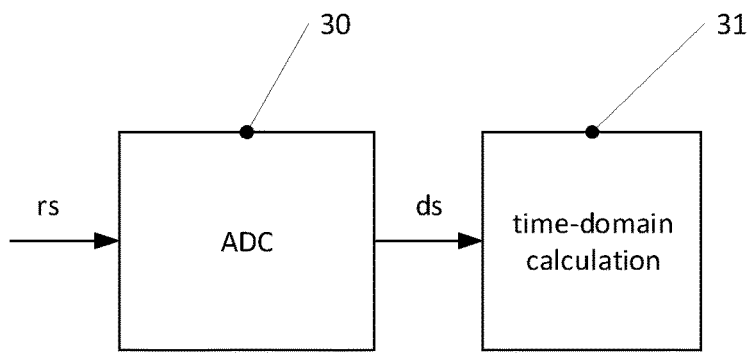
FIG. 3 is a block diagram of a radar device according to an embodiment.

FIG. 3 shows an embodiment of time-domain processing circuitry useable in embodiment. The embodiment of FIG. 3 includes an analog-to-digital converter (ADC) 30 receiving received radar signals rs. ADC 30 digitizes the received radar signals rs to provide a series of digital samples ds. Any suitable analog-to-digital converter may be used as ADC 30, for example a Sigma-Delta ADC, a tracking ADC, a successive approximation register (SAR) ADC or the like. The digital samples ds are then processed by a calculation in the time-domain represented by block 31 to detect motion. For example, block 31 may be implemented using a processor performing the calculations. In other embodiments, block 31 may be implemented as an application-specific circuit (ASIC) or other hardware dedicated to performing the calculations to detect motion, which allows an efficient implementation with low power consumption in some embodiments.

While a single ADC 30 is shown in FIG. 3, in other embodiments also a plurality of ADCs may be provided, for example for converting signals from different antennas of an antenna arrangement of transmitter/receiver arrangement 11 to digital samples.

Figure 4A:
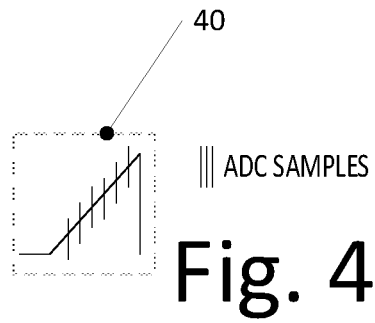
FIGS. 4A and 4B illustrate radar chirps usable in some embodiments.
Figure 4B:
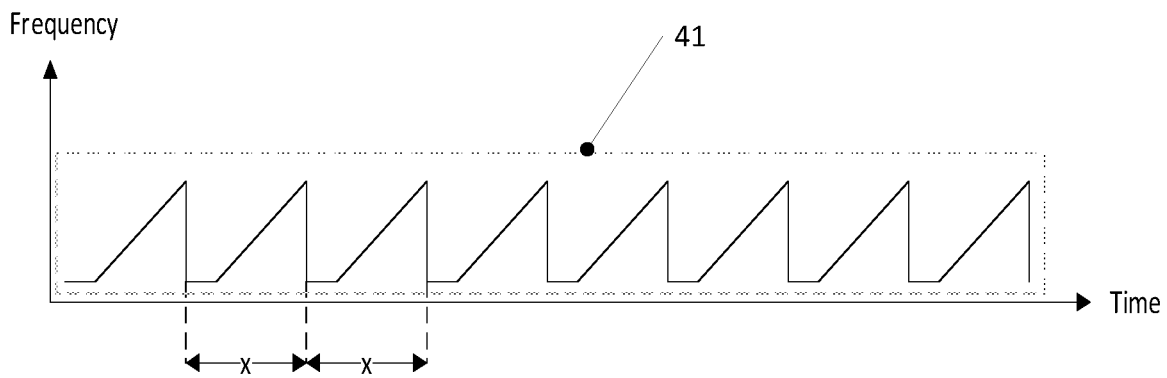

As already mentioned above, in some embodiments the radar signals may be radar chirps. This is illustrated in FIGS. 4A and 4B. FIG. 4A illustrates a single radar chirp 40, where the upward slope represents rising frequency over time. At different points in time, as illustrated by short vertical lines, ADC samples (for example, ds in FIG. 3) may be generated. The number of six ADC samples in a chirp is merely an example, and other number of samples, for example only a single example per chirp or two or more samples per chirp, may be generated.

Chirps may be sent successively in regular intervals x, as shown in FIG. 4B. A predefined number of chirps may be taken as a group of chirps, for which a group 41 including eight chirps is shown as an example in FIG. 4B. The number of eight chirps in group 41 again is only an example, and more or less chirps may also be used within each group.

In other embodiments, radar signals having a constant frequency may be used, e.g. a continuous wave (CW) radar, also referred to as Doppler radar. In some embodiments, to evaluate the received radar signals, essentially the same approach as for chirps described below may be used. In this case, the received radar signals for evaluation may be divided into time blocks (e.g., blocks having a predefined time duration), and with these time blocks the same processing as described below for chirps may be performed: One or more samples may be taken in each time block, differences between corresponding samples of different time blocks may be calculated etc. Instead of a chirp group, then a group of a predefined number of such time blocks may be used. When time blocks are used, a baseband part of a receiver arrangement like transmitter/receiver arrangement 11 may have a high pass filter behavior with a low corner frequency (e.g., about 5 Hz) such that Doppler signals may be provided to ADCs like ADC 30 of FIG. 3. Therefore, referring to chirps in the following explanation is only to be taken as an example.

In some embodiments, motion may be detected based on differences between corresponding ADC samples of different chirps, for example adjacent chirps. Differences of corresponding ADC samples means for example that a difference between the value of the first ADC sample of a first chirp to a first ADC sample of a second chirp, a difference between a second ADC sample of a first chirp and a second ADC sample of a second chirp etc. is provided. Examples for such a calculation will now be explained referring to FIGS. 5 to 7. For the following explanations, a number of ADCs NUM_ADC>=1 is used, with x as an index. For a number of ADC samples NUM_ADC_SAMPLES>=1, an index N may be used, and for a number of chirps CHIRP_GROUP>=1 in a chirp group, an index M may be used.

Figure 5:
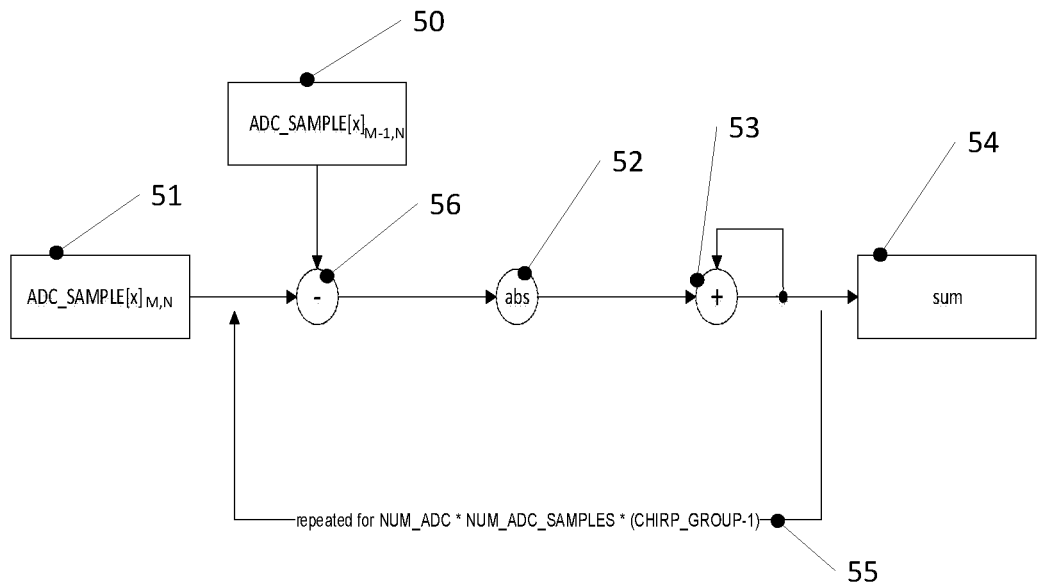
FIG. 5 is a diagram illustrating operation of radar device according to some embodiments.

In some embodiments, a sum of absolute differences between ADC sample values of different chirps is calculated for a chirp group. FIG. 5 is a diagram illustrating such a calculation.

In the embodiment of FIG. 5, a subtractor 56 forms the difference between an N-th ADC sample 51 of a chirp number M in a chirp group like chirp group 41 and an N-th ADC sample 50 from the M−1-th chirp in the chirp group, wherein M≥2 and N≥1, for an ADC x, x≥1. At 52, the absolute value of this sum is formed. The resulting value is summed up in an adder 53, and as indicated by 55 this is repeated for all ADCs (there may be only one), all ADC samples from one to NUM_ADC_SAMPLES and for all values M from two to course CHIRP_GROUP, and all ADCs, such that there are NUM_ADC*NUM_ADC_SAMPLES*(CHIRP_GROUP− 1) repetitions, and adder 53 sums up all absolute values, such that a sum 54 results. By comparing this sum to a threshold value, motion may be detected.

In the embodiment of FIG. 5, differences are formed between adjacent chirps (M and M−1). In other embodiments, also differences between non-adjacent chirps, for example between chirps M and M−2, may be used.

Figure 6:
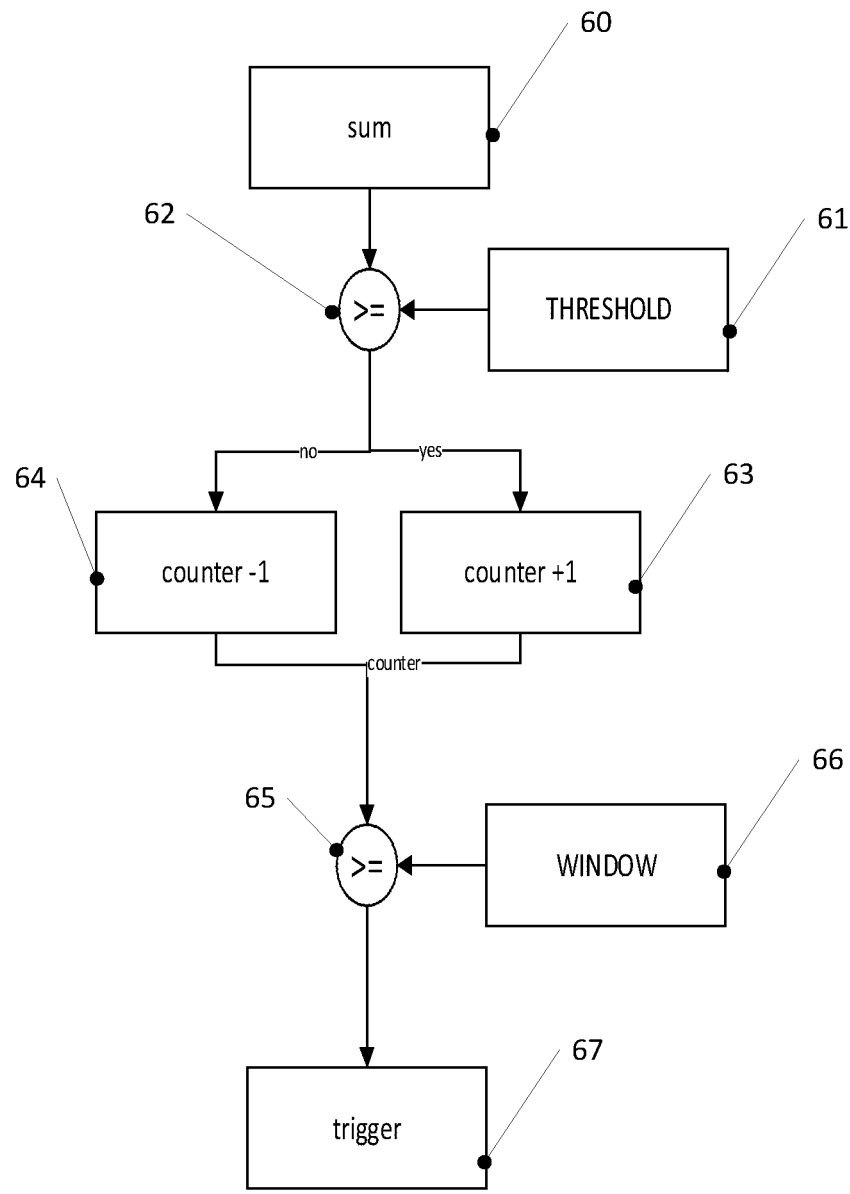
FIG. 6 is a flowchart an illustrating a method according to some embodiments.
Figure 7:
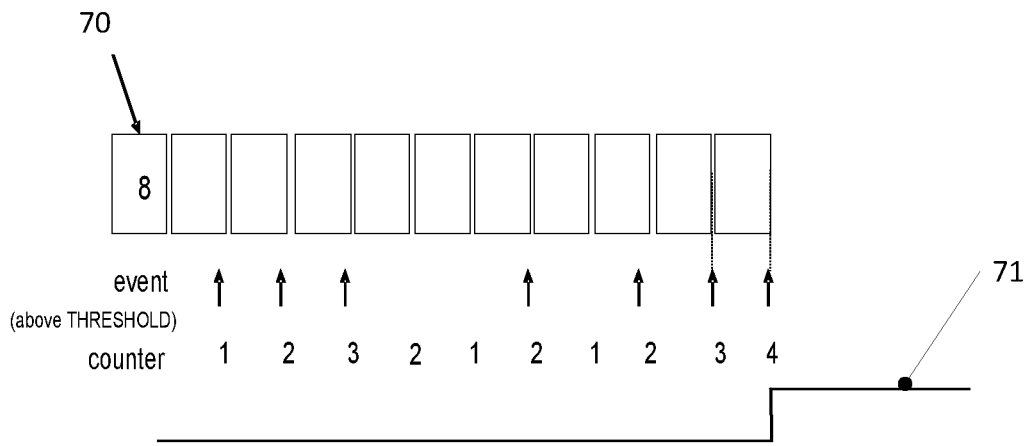
FIG. 7 is a diagram for illustrating operation according to some embodiments.

While in some embodiments a determination of movement is present may be made based on a single sum (by comparing the sum to a threshold), in other embodiments the sum may be monitored over a plurality of chirp groups, and only if the sum exceeds the threshold for a certain number of chirp groups (also referred to as window herein), it is determined that movement is present. FIG. 6 is a flowchart illustrating a corresponding embodiment, and FIG. 7 is an explanatory diagram for explaining FIG. 6 further.

The flowchart of FIG. 6 may be performed for each sum 54 resulting in FIG. 5 after processing a complete chirp group, which is, as sum 60 in FIG. 6, the starting point of the illustrated method. By a comparison 62, for example using a comparator, the sum is compared to a threshold 61. If the sum is greater than or equal to threshold 61, at 63 a counter is increased by 1, and if the sum is smaller than the threshold, at 64 the counter is decreased by 1. By a further comparison 65, which again may be implemented using a comparator, the counter value is compared to a window value 66, essentially a further threshold. The window value 66 sets a threshold how high the counter has to rise such that movement is considered to be detected. If the counter starts from 0, the window value gives an indication for how many consecutive chirp groups the sum 60 has to exceed the threshold 61. If the counter value exceeds the window value, at 67 a trigger is provided, which for example in FIG. 1 may activate frequency-domain processing circuitry 13.

The choice of threshold 61 may depend on the number of samples per chirp and the number of chirps in a chirp group.

For example, if a 12 bit ADC is used as ADC 30, samples with values from 0 to 4095 may be generated. In a first configuration A, 64 samples per chirps, 2 chirps per chirp group and 3 receivers (i.e., 3 ADCs, NUM_ADC=3) may result in an average sum of 30 at block 54 without movement. The average value depends on noise (which causes samples of different chirps to have different values even without movement) and may vary e.g., by ±5%.

In a second configuration B e.g., 64 samples per chirp, 4 chirps per chirp group and three receivers may be used, which may result in an average sum at 54 of 60. In a third configuration C, e.g. 64 samples per chirp, 8 chirps per chirp group and three receivers may be used, which may result in an average sum at 54 of 120.

The threshold 61 may then be set to be above the average sum for the respective configuration, for example at least 3 dB above the sum. For example, for configuration A, a threshold 61 of 60, for configuration B a threshold 61 of 120 and for configuration C a threshold 61 of 240 may be used, i.e. twice the average sum. These are merely some numerical examples, and other configurations and other thresholds 61 may also be used.

FIG. 7 shows an example case for the method of FIG. 6. A plurality of chirp groups 70, which as in FIG. 4B may for example include eight chirps each, are represented by rectangles. In a line labeled event, arrows mark those chirp groups 70 where the sum exceeds the threshold (as determined by comparison 62). With each chirp group where the threshold is exceeded, the counter value increases by 1, and with each chirp group where the sum is below the threshold (no arrow), the counter decreases by 1. At the last chirp group depicted, the counter reaches 4, which in this example corresponds to window value 66. As now the window value is reached, a trigger signal 71 changes its state, in the example shown from 0 to 1, which than for example may cause frequency-domain processing circuitry 13 and/or a microcontroller unit process for processing the radar signals is activated.

Figure 8:
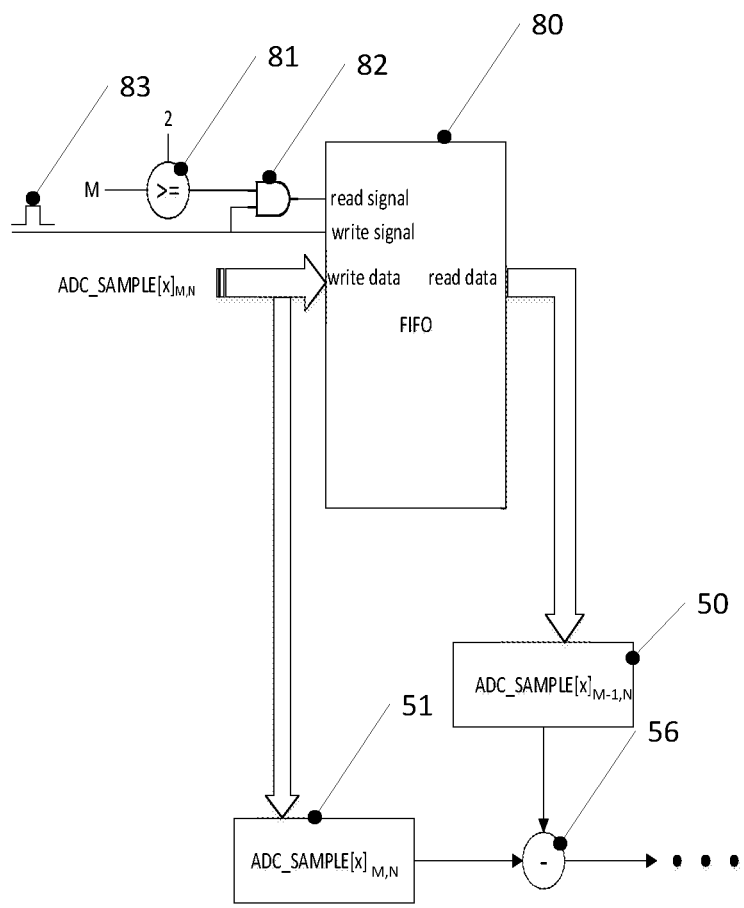
FIG. 8 is a block diagram illustrating part of a radar device according to some embodiments.

FIG. 8 illustrates a part of a radar device according to an embodiment, which illustrates an example for providing ADC samples 50 and 51 of FIG. 5.

A FIFO (first in first out) device 80, for example based on flip-flops (or another buffer for delaying samples), includes a data input "write data" receiving the ADC samples from an ADC, for example ADC 30 of FIG. 3, and a read output "read data". The write and read operations are triggered by a clock signal 83. Read furthermore starts when M is greater than or equal to 2 (see 81), realized by an AND-gate 82 receiving the clock signal and the result of the comparison of M with 2. This ensures that operation begins only after M has reached 2.

The received ADC sample is provided as ADC sample 50, and a previous ADC sample is written into FIFO 80 in a previous clock cycle is read out of FIFO 80 as ADC sample 50. The buffer length of FIFO 80 is selected based on the number of ADC samples (for example, six samples per chirp by FIG. 4A) such that the corresponding samples are provided as samples 50, 51, or, in other words, the next sample to be read out when ADC sample N from chirp M is provided to the write input of FIFO 80 and provided as ADC sample 51, ADC sample N from the previous chirp M−1 is read out, whereas the samples between (for example ADC sample [N, M+1]) are still stored in FIFO 80.

Some embodiments are defined by the following examples:

A method for a radar device includes receiving radar signals, and detecting motion based on time-domain processing of the received radar signals.

The method of example 1, wherein detecting motion comprises detecting motion based on differences between signal values of the received radar signals at different times.

The method of example 2, wherein the received radar signals are divided into received radar signal time blocks, and wherein detecting motion comprises detecting motion based on at least one difference of signal values between two different received radar signal time blocks.

The method of example 3, wherein the received radar signals include received radar chirps, and each received radar signal time block corresponds to a received radar chirp.

The method of example 3 or 4, wherein the two different received radar signal time blocks include temporally adjacent received radar signal time blocks.

The method of any one of examples 3 to 5, wherein the at least one difference includes a first plurality of differences between the two different received at a plurality of different corresponding temporal positions within the received radar signal time blocks.

The method of any one of examples 3 to 6, wherein the method comprises forming the at least one difference for a second plurality of sets of two different received radar signal time blocks of a time block group.

The method of example 7, further comprises summing absolute values of the differences of the at least one difference formed based on the time block group to obtain a sum, and detecting motion based on the sum.

The method of example 8, wherein detecting motion based on the sum includes: obtaining the sum for a plurality of time block groups; for each sum, increasing a counter if the sum exceeds a first threshold value and decreasing the counter if the sum is below the first threshold value; and determining that motion is present if the counter exceeds a second threshold value.

The method of any one of examples 1 to 9, further comprising activating frequency-domain processing circuitry for analyzing the received radar signals when motion is detected.

Example 11. A radar device includes a receive circuit configured to receive radar signals; and a time-domain processing circuit configured to detect motion based on time-domain processing of the received radar signals.

Example 12. The radar device of example 11, wherein the receive circuit and the time-domain processing circuitry are provided in a single package or provided on a single chip.

Example 13. The radar device of example 11 or 12, further comprising frequency-domain processing circuitry, wherein the time-domain processing circuitry is configured to activate the frequency-domain processing circuitry when motion is detected.

Example 14. The radar device of any one of examples 11 to 13, wherein the time-domain processing circuitry comprises at least one analog-to-digital converter configured to provide digital samples based on the received radar signals, wherein the time-domain processing circuitry is configured to detect motion based on differences between the digital samples.

Example 15. The radar device of example 14, wherein the received radar signals include received radar chirps, wherein the differences are differences between corresponding digital samples from different chirps.

Example 16. The radar device of any one of examples 11 to 15, wherein the radar device is configured to perform the method of any one of examples 1 to 10.

Example 17. A human machine interface comprising the radar device of any one of examples 11 to 16.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for a radar device, comprising:
   receiving, by a radar receive circuit, radar signals comprising radar chirps; and
   detecting, by a time-domain processing circuit, motion based on time-domain processing of the received radar signals, wherein:
   the received radar signals are divided into received radar signal time blocks, wherein the received radar signal time blocks comprise a first radar signal time block and a second radar signal time block different from the first radar signal time block,
   each received radar signal time block corresponds to a received radar chirp, and
   detecting the motion comprises:
      determining at least one difference between time-domain signal values between two different received radar signal time blocks by determining the at least one difference between a value of a first sample of the first radar signal time block and a value of a second sample of the second radar signal time block, wherein a time position of the first sample within a chirp of the first radar signal time block corresponds to a same time position of the second sample within a chirp of the second radar signal time block, and
      detecting the motion based on the determined at least one difference between the time-domain signal values between the two different received radar signal time blocks.

2. The method of claim 1, wherein the two different received radar signal time blocks include temporally adjacent received radar signal time blocks.

3. The method of claim 1, wherein the determined at least one difference includes a first plurality of differences between the two different received radar signal time blocks received at a plurality of different corresponding temporal positions within the received radar signal time blocks.

4. The method of claim 1, wherein the method further comprises forming the determined at least one difference for a second plurality of received radar signal time blocks of a time block group.

5. The method of claim 4, further comprising summing absolute values of differences of the determined at least one difference formed based on the time block group to obtain a sum, and detecting the motion based on the sum.

6. The method of claim 5, wherein detecting the motion based on the sum comprises:
   obtaining the sum for a plurality of time block groups;

for each sum, increasing a counter when the sum exceeds a first threshold value and decreasing the counter when the sum is below the first threshold value; and
determining that the motion is present when the counter exceeds a second threshold value.

7. The method of claim 1, further comprising activating frequency-domain processing circuitry for analyzing the received radar signals when the motion is detected.

8. A radar device, comprising:
a receive circuit configured to receive radar signals comprising radar chirps; and
a time-domain processing circuit configured to detect motion based on time-domain processing of the received radar signals, wherein:
the received radar signals are divided into received radar signal time blocks, wherein the received radar signal time blocks comprise a first radar signal time block and a second radar signal time block different from the first radar signal time block,
each received radar signal time block corresponds to a received radar chirp,
detecting the motion comprises:
determining at least one difference between time-domain signal values between two different received radar signal time blocks by determining the at least one difference between a value of a first sample of the first radar signal time block and a value of a second sample of the second radar signal time block, wherein a time position of the first sample within a chirp of the first radar signal time block corresponds to a same time position of the second sample within a chirp of the second radar signal time block, and
detecting the motion based on the determined at least one difference between the time-domain signal values between the two different received radar signal time blocks.

9. The radar device of claim 8, wherein the receive circuit and the time-domain processing circuit are provided in a single package or provided on a single chip.

10. The radar device of claim 8, wherein the time-domain processing circuit comprises:
an analog-to-digital converter configured to provide digital samples based on the received radar signals, wherein the time-domain processing circuit is configured to detect the motion based on determined differences between the digital samples.

11. The radar device of claim 8, wherein the radar device further comprises frequency-domain processing circuitry for analyzing the received radar signals after the motion is detected by the time-domain processing circuit.

12. A human machine interface comprising the radar device of claim 8.

13. A method comprising:
receiving a radar signal using a radar receiver, wherein the received radar signal comprises radar chirps;
digitizing the radar signal to form a digitized received radar signal using an analog-to-digital converter;
performing time-domain processing of the digitized received radar signal using a time-domain processing circuit, the time-domain processing comprising:
determining differences of samples of the digitized received radar signal from adjacent chirps of the radar chirps, wherein the samples of the digitized received radar signal comprise time-domain samples, and the differences of the samples are determined by forming differences between samples at same time positions of the adjacent chirps, and
determining whether motion is detected based on determining the differences; and
performing frequency-domain processing of the digitized received radar signal when the motion is detected.

14. The method of claim 13, wherein:
performing the time-domain processing further comprises accumulating the differences for a predetermined time period;
comparing the accumulated difference with a threshold; and
determining that the motion is detected according to the comparing the accumulated difference.

15. The method of claim 14, further comprising taking an absolute value of the determined differences before performing the accumulating.

16. The method of claim 14, wherein the predetermined time period corresponds to a chirp period of the digitized received radar signal.

17. The radar device of claim 8, wherein the two different received radar signal time blocks include temporally adjacent received radar signal time blocks.

18. The radar device of claim 8, wherein the at least one difference includes a first plurality of differences between the two different received radar signal time blocks received at a plurality of different corresponding temporal positions within the received radar signal time blocks.

19. The radar device of claim 8, wherein the time-domain processing circuit is further configured to form the at least one difference for a second plurality of received radar signal time blocks of a time block group.

20. The radar device of claim 19, wherein the time-domain processing circuit is further configured to sum absolute values of differences of the at least one difference formed based on the time block group to obtain a sum, and detect the motion based on the sum.

* * * * *